(12) United States Patent
Raje et al.

(10) Patent No.: US 8,613,101 B2
(45) Date of Patent: Dec. 17, 2013

(54) SOFTWARE DISTRIBUTION SERVICE FEDERATION

(75) Inventors: Hrishikesh S. Raje, Seattle, WA (US); Christopher S. Gouge, Redmond, WA (US); Rajasekaran Rangarajan, Kirkland, WA (US); Leo Edwin Lie, Bellevue, WA (US); Jimin Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 23 days.

(21) Appl. No.: 13/230,536

(22) Filed: Sep. 12, 2011

(65) Prior Publication Data

US 2013/0067599 A1  Mar. 14, 2013

(51) Int. Cl.
H04L 9/32 (2006.01)
(52) U.S. Cl.
USPC .................................. 726/26; 726/27; 726/30
(58) Field of Classification Search
USPC .............. 726/1–6, 26–31; 713/168–170, 191
See application file for complete search history.

(56) References Cited

U.S. PATENT DOCUMENTS

| | | | |
|---|---|---|---|
| 7,013,461 B2 | 3/2006 | Hellerstein et al. | |
| 7,254,631 B2 * | 8/2007 | Crudele et al. | 709/224 |
| 7,478,381 B2 | 1/2009 | Roberts et al. | |
| 7,539,686 B2 | 5/2009 | Shepard et al. | |
| 7,698,744 B2 * | 4/2010 | Fanton et al. | 726/27 |
| 7,853,609 B2 | 12/2010 | Dehghan et al. | |
| 2010/0281475 A1 | 11/2010 | Jain et al. | |

OTHER PUBLICATIONS

Harder, Bobble, "Managing the WSUS Automatic Updates Client Download, Install, and Reboot Behavior with Group Policy", Published on May 4, 2006, Available at <<http://technet.microsoft.com/en-us/library/cc512630.aspx>>.
"About the Version Control Repository Manager", retrieved on Sep. 5, 2011 at <<http://www.hp.com/wwsolutions/misc/hpsim-helpfiles/mxhelp/mxportal/en/useTools_vc_about_vcrm.html>>.
"What is YUM?", retrieved on Sep. 5, 2011 at <<http://www.wisegeek.com/what-is-yum.htm>>.
"Apple—App Store", retrieved on Sep. 5, 2011 at <<http://www.apple.com/mac/app-store/>>.
"Publishing on Android Market", retrieved on Sep. 5, 2011 at <<http://developer.android.com/guide/publishing/publishing.html>>.
"WPKG overview", retrieved on Sep. 5, 2011 at <<http://wpkg.org/WPKG_overview>>.

* cited by examiner

Primary Examiner — Hosuk Song
(74) Attorney, Agent, or Firm — Lee & Hayes, PLLC

(57) ABSTRACT

Software update distribution techniques are disclosed. Authentication information is received, from a content source authenticator, by an update agent included in a client device. The authentication information comprises a list of a plurality of content sources, wherein the plurality of content sources have been verified by the content source authenticator as being authentic content sources for legitimate software applications. The update agent selects a first content source of the plurality of content sources, where the first content source is configured to provide updates for a first software application. The update agent checks the first content source for updates for the first software application.

20 Claims, 6 Drawing Sheets

SOFTWARE DISTRIBUTION SERVICE FEDERATION

BACKGROUND

Software updates are an essential part of delivering continuing security and other critical fixes to various software applications. The past few years have seen an increase in the number of update and other critical software distribution mechanisms provided by different software providers. An update mechanism of a software application may be configured to check for updates, download newly available updates in a client machine, notify users of the client machine about the newly available updates, and/or install the newly available updates.

Typically, each individual software application (or a group of software applications) implements its own update mechanism. Various update mechanisms of the client machine may run independently on the client machine, may have independent user interfaces, and may not have any coordinated settings or schedules for checking, downloading and/or installing updates. Users of the client machine may need to keep track of the various update mechanisms, and manage each one of the various update mechanisms independently.

SUMMARY

This summary introduces simplified concepts of software update distribution systems, which is further described below in the Detailed Description. This summary is not intended to identify essential features of the claimed subject matter, nor is it intended for use in limiting the scope of the claimed subject matter.

This application describes example embodiments of software update distribution systems, which provides a centralized way of managing application of updates for multiple software applications through federation of independently managed content sources. Generally, software update distribution systems as described herein employ an update agent of a client device, which interfaces with a content source authenticator to provide a centralized source for users of the client device to update all applications that are registered with, or otherwise deemed legitimate by, the content source authenticator.

In an embodiment, the content source authenticator may determine that each of a plurality of software applications are legitimate software applications, and a plurality of content sources are authentic content sources for providing updates for the corresponding plurality of software applications. Based on such determination, the content source authenticator may generate authentication information that comprises a list of the plurality of content sources. The authentication information may also comprise, for each of the plurality of content sources, an authorization token that indicates an authenticity of the corresponding content source and an expiration time of the authorization token.

In an embodiment, the update agent in the client device may receive, from the content source authenticator, the authentication information. The update agent may select one or more of the plurality of content sources included in the list of the authentication information. The selected one or more content sources may provide updates for one or more corresponding software applications that are installed in the client device. The update agent may check the one or more content sources for updates for the one or more corresponding software applications. The update agent may also download and/or install the updates from the one or more content sources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
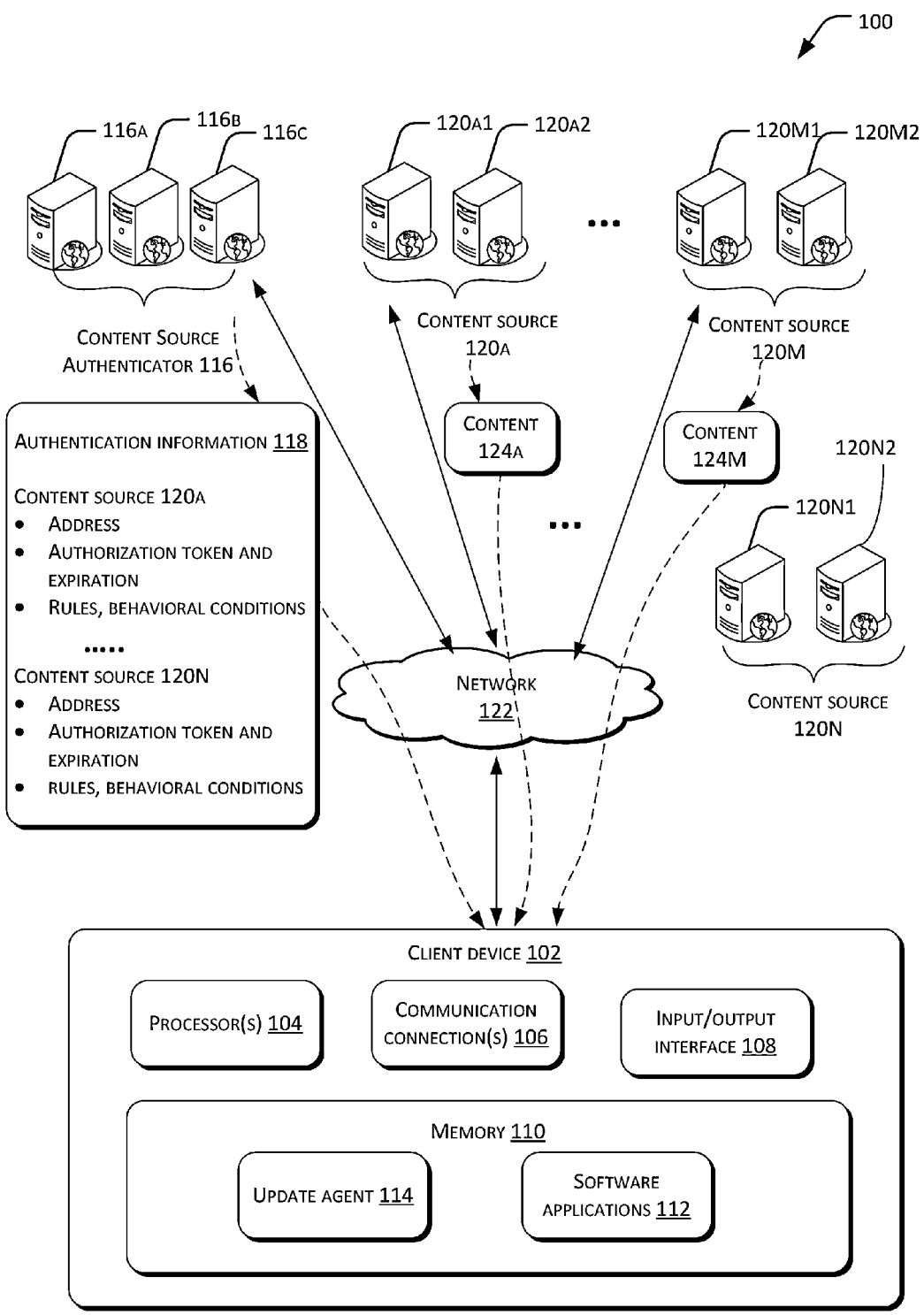
FIG. 1 illustrates an example environment usable to implement a software update distribution system.

As noted above, existing technologies fail to manage updating various software applications in a cohesive manner. Generally, a client device may have a large number of software applications installed. Each software application may need to be updated periodically. A content source may be configured to provide updates for corresponding one or more software applications. Accordingly, the client device may have to check a large number of content sources corresponding to the large number of installed software applications. In conventional systems, this may result in the user frequently being prompted to update different applications at different (sometimes inconvenient) times.

This disclosure describes a software update distribution system, in which updates of various software applications are checked, downloaded and installed in an organized manner. The software update distribution system provides a centralized way of managing application of updates for multiple software applications through federation of independently managed content sources. Generally, the software update distribution system as described herein employ an update agent of a client computer, which interfaces with a content source authenticator to provide a centralized source for users to update all applications that are registered with, or otherwise deemed legitimate by, the content source authenticator.

The content source authenticator may be associated with an entity that users of the client device can rely on or trust. For example, the content source authenticator may be associated with a provider of an operating system of the client device, a provider of an anti-virus software of the client device, and/or the like.

The content source authenticator may identify a plurality of software applications that the content source authenticator deems to be legitimate software applications (e.g., does not include any malicious software component, and is not used for any illegal purposes). The content source authenticator may also identify a plurality of content sources that the content source authenticator deems to be authentic content sources for updates for the corresponding plurality of software applications. For example, the content source authenticator may verify that Microsoft Office® and Microsoft Windows® operating system are legitimate software applications, and may also verify a Microsoft® server to be an authentic content source for providing updates for the Microsoft Office® and the Microsoft Windows® operating system. In another example, if a content source provides updates for a software application and the content source authenticator determines that the software application may be malicious, then the content source authenticator may refrain from registering or authenticating the content source. In an embodiment, once the content source authenticator verifies an authenticity of a content source, the content source authenticator may enter in an agreement with a provider of the content source to include the content source in a list of verified and authenticated content sources (e.g., register the content source).

The content source authenticator may then generate authentication information that includes identification of the verified and authenticated content sources. Thus, the authentication information may include a list of a plurality of content sources that provide updates to a corresponding plurality of software applications (e.g., each content source may provide updates for corresponding one or more software applications). In an embodiment, the authentication information may also include, for each of the content sources, an authorization token (e.g., which indicates an authenticity of the content source, as verified by the content source authenticator) and an expiration time of the authorization token. In an embodiment, the authentication information may also include one or more rules and/or one or more behavioral conditions associated with each of the verified content sources.

The content source authenticator may transmit some or all of the authentication information to the client device. Once the client device receives the authentication information, the client device may select one or more of the content sources listed in the authentication information. Such a selection may be based on, for example, verifying one or more rules included in the authentication information. For example, the authentication information may include a list of content sources, including content sources for providing updates to Microsoft Office®, Adobe Acrobat®, Firefox® browser, Chrome® browser, and Internet Explorer®. However, a user of the client device may have authorized Microsoft Office®, Adobe Acrobat® and Internet Explorer® services in the client device 102, but may not have authorized Firefox® browser and Chrome® browser services in the client device 102. Accordingly, the client device may select content sources that provide updates for Microsoft Office®, Adobe Acrobat® and Internet Explorer®, and refrain from selecting content sources that provide updates for Firefox® browser and Chrome® browser.

The client device may then check for updates (e.g., based on the associated behavioral conditions included in the authentication information) from the selected content sources, and possibly download and install updates from the selected one or more content sources. Behavioral conditions associated with a content source may include, for example, a frequency and a schedule for checking updates from the content source.

This disclosure describes multiple and varied implementations and embodiments. The following section describes an example environment that is suitable for practicing various implementations. Next, the application describes example user interfaces and example methods for implementing a software update distribution system.

Exemplary Architecture

FIG. 1 illustrates an example environment 100 usable to implement a software update distribution system. The environment 100 includes a client device 102. The client device 102 may be implemented as any of a variety of conventional computing devices including, for example, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof.

The client device 102 includes one or more processors 104 coupled to memory 110. The client device 102 may further include one or more communication connection(s) 106 and one or more input/output interfaces 108. The communication connection(s) 106 allow the client device 102 to communicate with other computing devices over wired and/or wireless networks and may include, for example, wide area, local area, and/or personal area network connections. For example, the communication connection(s) 108 may include cellular network connection components, WiFi network connection components, Ethernet network connection components, or the like. Depending on the type of client device, the input/output interfaces 108 may include, for example, a touch screen or other display, a keyboard, a mouse, a touch pad, a roller ball, a scroll wheel, an image capture device, an audio input device, an audio output device, and/or any other input or output devices.

The memory 110 is an example of computer-readable media. Computer-readable media includes at least two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 110 includes an update agent 114 and one or more software applications 112. As an example, the software applications 112 may include an operating system (e.g., Windows® operating system, Mac® operating system, or the like), one or more platform software applications (e.g., Java®), and/or various application programs (e.g., a web browser, an email client, a word processing application, a spreadsheet application, a voice recording application, a calendaring application, a news application, a text messaging client, a media player application, a photo album application, an address book application, a weather application, a viewfinder application, a social networking application, a game, and/or the like). In an embodiment, the update agent 114 is an application within an operating system of the client device 102. For purposes of clarity, the update agent 114 is illustrated to be separate from the software applications 112, although in an embodiment, the update agent 114 is a software application included in the client device 102.

The example environment 100 may include a content source authenticator 116 and a plurality of content sources 120A, . . . , 120N. Each of the content sources 120A, . . . , 120N may provide software updates (hereinafter also referred to as updates) for one or more corresponding software applications. For example, the content source 120A may provide updates for one or more Adobe® software applications (e.g., for Adobe Reader®, Adobe Photoshop®, Adobe Flash Player®, etc.). In another example, the content source 120B may provide updates for Chrome® browser available from Google® Inc. In another example, the content source 120C may provide updates for Java® platform. In yet another example, the content source 120D may provide updates for one or more Microsoft® Inc. products, e.g., Microsoft Windows® operating system, Microsoft Office®, etc. Thus, a content source may provide updates for a single software application, or for more than one software applications. In an embodiment, in addition to providing updates to one or more software applications, a content source may also provide any other appropriate content, e.g., software application(s), non-application content (e.g., music, movies, or any other appropriate media, etc.), and/or the like.

The content source authenticator 116 may verify and authenticate one or more of the plurality of content sources 120A, . . . , 120N as being authentic content sources for providing updates for one or more legitimate software applications. The content source authenticator 116 may act as a centralized repository of a list of content sources, which have been verified and authenticated with the content source authenticator 116. In an embodiment, the client device 102 may communicate with the content source authenticator 116 and the content sources 120A, . . . , 120M over a network 122, and the client device 102 may refrain from communicating with the content source 120N, as will be discussed in more detail herein later.

In an embodiment, the content source authenticator 116 may be implemented as an application hosted on servers 116A, . . . , 116C. Although three servers 116A, . . . , 116A are associated with the content source authenticator 116, in another embodiment, any other number of servers (e.g., one, two, four or more) may be associated with the content source authenticator 116. As an example, the content source authenticator 116 may be embodied in any number of ways, including as a single server, a cluster of servers, a server farm or data center, and so forth, although other server architectures (e.g., mainframe) may also be used.

In an embodiment, each of the content sources 120A, . . . , 120N is hosted on one or more servers. For example, the content source 120A is hosted on servers 120A1 and 120A2, the content source 120N is hosted on servers 120N1 and 120N2, and so on. Although in FIG. 1 only two servers are associated with each of the content sources, any other number of servers (e.g., one, three, or more) may be associated with each of the content sources. As an example, individual content sources may be embodied in any number of ways, including as a single server, a cluster of servers, a server farm or data center, and so forth, although other server architectures (e.g., mainframe) may also be used. In an embodiment, multiple content sources may, for example, be collectively hosted as a single server, a cluster of servers, a server farm or data center, and so forth, although other server architectures (e.g., mainframe) may also be used.

The network 122 may be a wireless or a wired network, or a combination thereof. The network 128 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof.

In an embodiment, the content source authenticator 116 may be associated with an entity that users of the client device 102 can rely on or trust. For example, the content source authenticator 116 may be associated with (e.g., owned by, operated by, or otherwise associated with) a provider of an operating system of the client device 102, a provider of an anti-virus software of the client device 102, and/or the like. In an example, an appropriate version of the Windows® operating system may be installed in the client device 102, and the content source authenticator 116 may be owned by, operated by, or associated with Microsoft®.

In an embodiment, the content source authenticator 116 may verify an authenticity of a content source (e.g., content source 120A) and a legitimacy of a software application for which the content source provides updates. That is, the content source authenticator 116 may verify that the content source is an authentic source for providing updates for a legitimate software application. For example, the content source authenticator 116 may verify that the Microsoft Office® is a legitimate software application (e.g., does not include any malicious software component), and may also verify a Microsoft® server to be an authentic content source for providing updates for the Microsoft Office®. In another example, if a content source provides updates for a software application and the content source authenticator 116 determines that the software application may be malicious or otherwise not suitable for authentication by the content source authenticator 116, then the content source authenticator 116 may refrain from verifying an authenticity of the content source. In an embodiment, any time after verifying a content source to be an authentic source, the content source authenticator 116 may revoke such authentication of the content source if the content source authenticator 116 deems the content source to be providing malicious updates or if the content source does not meet the requirements set for authentic content sources.

In an embodiment, once the content source authenticator 116 verifies an authenticity of a content source (e.g., content source 120A), the content source authenticator 116 may enter in an agreement with a provider of the content source to register the content source (e.g., to include the content source in a list of verified and authenticated content sources). Thus, the content source authenticator 116 may act as a repository of a list of content sources, which are verified and authenticated with the content source authenticator 116. It is to be noted that the content sources 120A, . . . , 120N may be independent of each other and also independent from the content source authenticator 116. For example, the content sources 120A, . . . , 120N may be managed independently (and not managed by the content source authenticator 116). Although, in an embodiment, one or more content sources may be managed by an entity that also manages the content source authenticator 116 (e.g., Microsoft® may own and/or manage the content source authenticator 116, and also own and/or manage one or more content sources that provides updates for Microsoft Windows® operating system and Microsoft Office®).

In an embodiment, the verification of the content sources may be performed ahead of time, well before the update agent 114 receives any communication from the content source authenticator 116. In an embodiment, the content source authenticator 116 may periodically update the list of verified and authenticated content sources.

In an embodiment, the content source authenticator 116 may generate and/or maintain authentication information 118, and the update agent 114 may periodically receive the authentication information 118 from the content source authenticator 116 over the network 128. The authentication information 118 may include identification (e.g., a list) of a plurality of content sources that have been verified by the content source authenticator 116 as authentic content sources. For example, the authentication information 118 may include identification of verified content sources 120A, . . . , 120N.

The authentication information 118 may also include, for each of the plurality of content sources 120A, . . . , 120N, an address or location information of the content source (e.g., an Internet Protocol (IP) address of the content source, a Uniform Resource Locator (URL) of the content source, and/or the like).

In an embodiment, the authentication information 118 may also include, for each of the plurality of content sources 120A, . . . , 120N, an authorization token (e.g., which indicates an authenticity of the content source, as verified by the content source authenticator 116) and an expiration time of the authorization token. In an example, once an authorization token of a content source expires, the content source authenticator 116 and/or the update agent 114 may view the content source as no longer being authenticated by the content source authenticator 116. In an embodiment, the content source authenticator 116 may revoke authentication of a content source at any time by removing information about the content source from the authentication information 118. Once the update agent 114 receives the authentication information 118 from the content source authenticator 116, the update agent 114 may verify, for each of the content sources included in the authentication information 118, whether the associated authorization token is valid and unexpired.

In an embodiment, the authentication information 118 may also include one or more rules associated with each of the verified content sources 120A, . . . , 120N. The update agent 114 may verify, for each of the content sources, whether the update agent 114 may check the content source for new updates based on the one or more associated rules.

For example, a rule associated with the content source 120A may specify that the update agent 114 may check for new updates for a software application from the content source 120A if a registry key or a file is stored in the client device 102. The presence of the registry key or the file in the client device 102 may indicate, for example, that the software application is installed in the client device 102, the user has approved updating the software application and/or running the software application in the client device 102, and/or the like. In another example, a rule associated with the content source 120N may specify that the update agent 114 may refrain from checking for updates for another software application from the content source 120N if another registry key or another file is not stored in the client device 102 (which would indicate that the another software application is not installed in the client device 102).

As an example, in the embodiment illustrated in FIG. 1, the authentication information 118 may include a list comprising content sources 120A, . . . , 120N. As previously discussed, the update agent 114 may verify that each of the content sources 120A, . . . , 120N has an associated un-expired authorization token, and may also check for one or more rules associated with the content sources 120A, . . . , 120N. In the embodiment of FIG. 1, content sources 120A, . . . , 120M satisfies the corresponding rules for checking updates from these content sources, and accordingly, the update agent 114 checks for updates from the content sources 120A, . . . , 120M. However, the content source 120N does not satisfy the corresponding rules for checking updates from the content source 120N (e.g., the software application, for which the content source 120N provides updates, is not installed in the client device 102). Accordingly, the update agent 114 refrains from checking for updates from the content source 120N.

The authentication information 118 may also include one or more behavioral conditions associated with each of the content sources. Behavioral conditions of a content source may specify, for example, a recommended manner in which the update agent 114 may check for updates from the content source.

Behavioral conditions associated with a content source may include, for example, a frequency and/or a schedule for checking, downloading, and/or installing updates from the content source. For example, the authentication information 118 may specify that the update agent 114 may check, download and/or install updates from the content source 120A every Sunday at 9 PM.

Behavioral conditions associated with a content source may also specify, for example, a suggested user interaction associated with checking, downloading and/or installing updates from the content source. For example, behavioral conditions associated with a content source may specify whether the update agent 114 automatically checks, downloads and/or installs new updates from the content source, or whether the update agent 114 requires input from a user of the client device 102 to check, download and/or install new updates from the content source. In another example, behavioral conditions associated with a content source may also specify if the user of the client device 102 should be notified about updates that have been downloaded and installed automatically.

The authentication information 118 may also include various other behavioral conditions. For example, behavioral conditions may specify that if the client device 102 is on a domain (e.g., is on a corporate network), then the update agent 114 may not check for new updates without permission from an administrator of the client device 102. In another example, behavioral conditions may specify an order in which the update agent 114 may check, download and/or install updates from one or more of the content sources 120A, . . . , 120N (e.g., may specify to check for updates from content source 120C after checking for updates from content source 120A).

In an embodiment, the client device 102 may override one or more behavioral conditions included in the authentication information 118. For example, a behavioral condition may specify automatic downloading (e.g., downloading without any input from a user of the client device 102) of updates from the content source 120A. However, the user of the client device 102 may configure the update agent 114 to override the automatic downloading condition associated with the content source 120A. Thus, in spite of the behavioral condition of the content source 120A specifying automatic downloading of updates from the content source 120A, the update agent 114 may download updates from the content source 120A after notifying and receiving permission from the user of the client device 102. In an embodiment, the authentication information 118 may specify one or more parameters or conditions that the client device 102 is allowed to set (or is allowed to override).

A content source may also override one or more default behavioral conditions included in the authentication information 118, and/or may choose from one or more behavioral condition options included in the authentication information 118. For example, a default behavioral condition in the authentication information 118 may specify that the client device 102 may refrain from automatically downloading updates from the content source 120B. However, the content source 120B may override this default behavioral condition by enabling automatic downloading and installation of updates whenever the update agent 114 checks the content source 120B for new updates. In an embodiment, the authentication information 118 may specify one or more conditions or parameters that a content source is allowed to set (or is allowed to override). For example, the authentication information 118 may provide a set of options (e.g., automatic downloading, manual downloading, etc.), and a content source may choose an option from the set of options included in the authentication information 118.

In an embodiment, an integrity of the authentication information 118 may be protected by, for example, an .xml file signed by the content source authenticator 116, and the client device (e.g., the update agent 114) may verify the signed .xml file to authenticate the authentication information 118. Any other appropriate manner of protecting the integrity of the authentication information 118 may also be envisioned. For example, an authorization token of a content source may be a signed cabinet file (i.e., .cab file) containing XML data that includes various information (e.g., one or more of the previously discussed rules and behavioral conditions, etc.) about the associated content source. In various other embodiments, other suitable formats of the authorization tokens may be used, including but not limited to a signed file of any appropriate format, WS-Security tokens using Simple Object Access Protocol (SOAP) authentication, etc.

As previously discussed, the update agent 114 may periodically receive the authentication information 118 from the content source authenticator 116. For example, the update agent 114 may periodically transmit a request to the content source authenticator 116 for the authentication information 118, based on which the content source authenticator 116 may transmit a current version of the authentication information 118 to the update agent 114. Additionally or alternatively, the content source authenticator 116 may periodically transmit the current version of the authentication information 118 to the update agent 114 without receiving an explicit request for the same from the update agent 114. Additionally or alternatively, the content source authenticator 116 may transmit the authentication information 118 to the update agent 114 whenever the authentication information 118 is updated by the content source authenticator 116.

Behavioral conditions associated with different content sources may be different. In an embodiment, the update agent 114 may aggregate the behavioral conditions associated with the different content sources, and develop a unified behavioral condition (e.g., an optimal or a near optimal behavioral conditions) for checking for updates from the different content sources. For example, the authentication information 118 may specify different frequencies and schedules for checking for new updates from the different content sources. The update agent 114 may develop a unified frequency and schedule for checking updates from the different content sources.

In an embodiment, the update agent 114 may treat each of the content sources 120A, ..., 120M in a mutually exclusive manner. For example, the update agent 114 may check for updates from the content sources 120A, ..., 120M independently (although a frequency and/or a schedule of such checking may be similar) such that a result of checking a first content source for updates may not impact a manner in which a second content source is checked for updates.

In an embodiment, checking for updates from a content source may be dependent on checking for updates from another content source. That is, a result of checking a content source for updates may affect checking a second content source for updates. As an example, failing to check a specific content source for updates may also cause a similar failure for one or more other content sources. In another example, newly available updates from one content source may cause the update agent 114 to re-check for updates from another content source (or may cause the update agent to skip checking for updates from yet another content source). As an example, if an update for Microsoft Office® is available from a content source, downloading and installing the update may necessitate checking for updates for a software application that is based on Microsoft Office® (e.g., such that the software application is compatible with the newly updated version of Microsoft Office®). In another example, if an update for Adobe Flash® is available from Adobe®, then installing the update might necessitate checking for updates from another content source providing updates for a media application (as the media application may implement new functionalities based on the Adobe Flash® update). In an embodiment, such interdependency of various content sources may be specified in the authentication information 118. Additionally or alternatively, the update agent 114 may generate such interdependency of various content sources, based on information received in the authentication information 118.

In some situations, a first update available from a first content source and a second update available from a second content source may have common content. For example, an update of Microsoft Office® and an update of Internet Explorer® (both of which are provided by Microsoft®) may have common content. In an embodiment, if two updates from two different content sources have common content, the update agent 114 may download and/or save only a single copy of the common content, and use the common content to install the two updates. The update agent 114 may select one of the two content sources from which the common content is to be downloaded (e.g., based on available bandwidth between the update agent and the two content sources). The update agent 114 may also download a first section of the common content from a first of the two content sources, and download a second section of the common content from a second of the two content sources. In an embodiment, the update agent 114 may assign unique identifiers for each section of content flowing from the various content sources to the client device 102, and the update agent 114 may assign a unique identifier to a section that is common to two different updates. Thus, a unique identifier is use to indentify duplicate contents across various content sources.

While the content source authenticator 116 may serve as a centralized location to manage updates for multiple software applications, in an embodiment, it may not necessarily work with all software applications on the client device 102. For example, a content source, which provides updates for a legitimate software application, may not be registered with the content source authenticator 116. Thus, even though the software application is legitimate, the corresponding content source may not be included in the authentication information 118. In an embodiment, the update agent 114 may check, download and/or install updates for such a software application from the corresponding content source after receiving notification and/or instruction from a user of the client device 102. Additionally or alternatively, the software application may have its own updater (which may be different from the update agent 114) installed in the client device 102, and the updater may check, download and/or install updates for the software application in the client device 102 independent of the update agent 114.

Example User Interfaces

Figure 2:
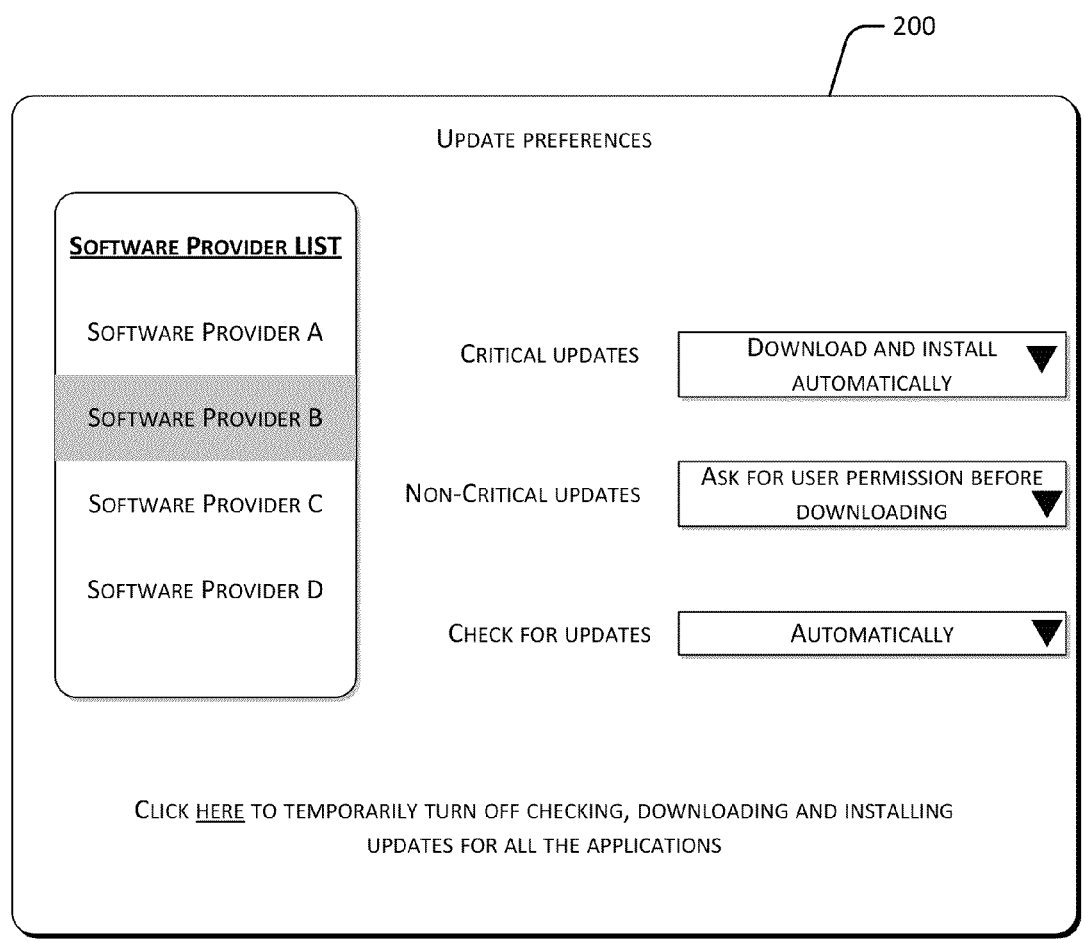
FIG. 2 illustrates an example user interface for configuring various behavioral conditions associated with one or more content sources.

In an embodiment, the update agent 114 may provide the user with an option to change one or more default behavioral conditions associated with a content source. For example, the update agent 114 may allow the user to specify automatic downloading and installation of updates from the content source, a schedule and a frequency of checking for updates from the content source, etc. FIG. 2 illustrates an example user interface (UI) 200 for configuring various behavioral conditions associated with one or more content sources. The UI 200 may be displayed, for example, on a touch screen or a display of the client device 102. The user of the client device 102 may configure various parameters in the UI 200 using any appropriate interface, e.g., a keyboard, a mouse, a touch pad, a roller ball, a scroll wheel, and/or any other input devices of the input/output interfaces 108.

Referring to FIGS. 1 and 2, in an embodiment, the UI 200 may display a list of software providers that provides one or more software applications, which are installed in the client device 102 and for which the update agent 114 is configured to check updates. As an example, the software provider A may be Adobe®, which provides software applications like Adobe Reader®, Adobe Photoshop®, Adobe Flash Player®, etc. The content source 120A may be configured to provide software updates for one or more software applications provided by the software provider A. In another example, the software provider B may be Google®, which provides one or more software applications like Chrome® browser, Google Earth®, Picasa®, etc. The content source 120B may be configured to provide software updates for one or more software applications provided by the software provider A. In yet another example, the software provider C may be Microsoft®, which provides one or more software applications like Microsoft Windows® operating system, Microsoft Office®, etc. The content sources 120C and 120D may be configured to provide software updates for one or more software applications provided by the software provider C. In yet another example, the software provider D may provide a single software application installed in the client device 102. The content source 120E may be configured to provide software updates for the software application provided by the software provider D. Although FIG. 2 illustrates only four software providers, the list may include any other appropriate number of software providers The UI 200 may select a software provider (e.g., software provider B is selected in FIG. 2), and configure various parameters (i.e., behavioral conditions) associated with receiving updates from one or more content sources (e.g., content source 120B) for the software applications provided by the software provider B. For example, updates for the software applications provided by the software provider B may be classified as critical updates and non-critical updates. The user may choose (e.g., from a drop down list) whether critical updates are to be downloaded and installed automatically, or if user permission is required to download and/or install critical updates. Similar options may be provided for non-critical updates. In the example UI 200 of FIG. 2, critical updates of the software applications provided by the software provider B are selected to be downloaded and installed automatically, and user permission is required before downloading non-critical updates. The user may also set a frequency and schedule for checking for updates. In the example UI 200 of FIG. 2, updates are set to be checked automatically (e.g., based on a frequency and schedule specified in the authentication information 118, and/or a frequency and schedule determined by the update agent 114).

In an embodiment, the UI 200 may provide an option to temporarily turn off checking, downloading and/or installing updates (and/or notifying a user about the updates) for software applications provided by all the software providers. Such a global switching off may be useful, for example, while the user is using the client device 102 for a specific activity (e.g., using the client device 102 for a presentation, during which the user do not want any update notification to pop-up).

Figure 3:
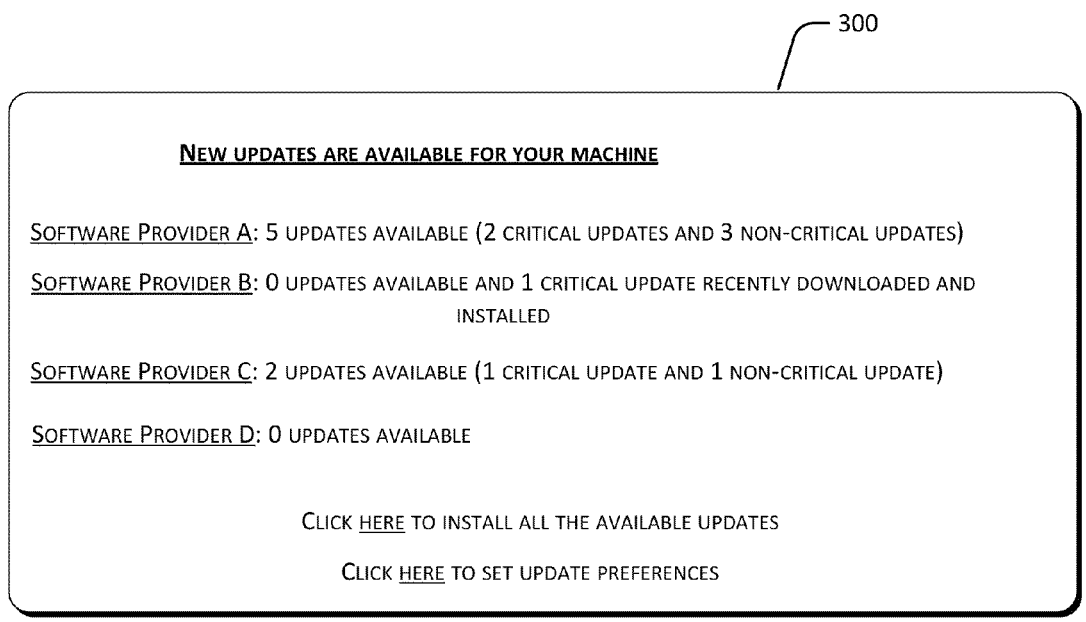
FIG. 3 illustrates an example user interface for notifying a user of the client device about available updates from various content sources.

FIG. 3 illustrates an example user interface (UI) 300 for notifying a user of the client device 102 about available updates from various content sources. The UI 300 may be displayed, for example, on a touch screen or a display of the client device 102. The user of the client device 102 may set various preferences in the UI 300 using any appropriate interface, e.g., a keyboard, a mouse, a touch pad, a roller ball, a scroll wheel, and/or any other input devices of the input/output interfaces 108.

Referring to FIGS. 1 and 3, the UI 300 displays a list of available updates for software applications provided by various software providers. The update agent 114 may receive the authentication information 118, based on which the update agent 114 may check for updates from content sources associated with software providers A, . . . D. In an embodiment, the update agent 114 may automatically download and install updates for one or more software applications provided by one or more software providers, and may require user consent for downloading and installing updates for another one or more software applications provided by another one or more software providers (e.g., based on behavioral conditions specified in the authentication information 118 and/or preferences set by the user through the UI 200). For example, automatic downloading and installation of updates may be set for software applications of software providers B and D, and user consent may be required for downloading and installing updates for software applications of software providers A and C. Accordingly, the UI 300 illustrates that no updates are available for software applications of software providers B and D (as updates for software applications of these two software providers are automatically downloaded and installed), and one critical update for a software application of the software provider B has been recently downloaded and installed (e.g., downloaded and installed automatically). The UI 300 also illustrates critical and non-critical updates available for software applications of software providers A and C. In the UI 300, the user may choose all the available updates for downloading and installation, or may click on individual software providers to select one or more updates for one or more associated software applications for downloading and installation.

Example Methods

Figure 4:
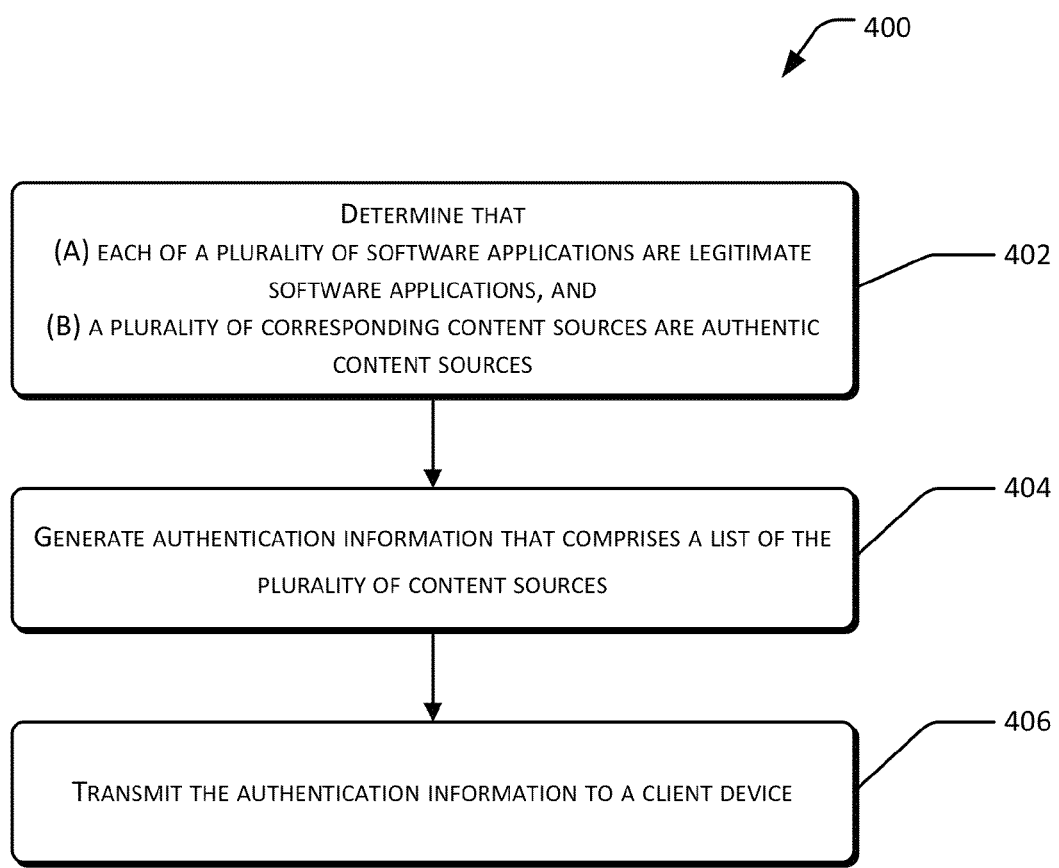
FIG. 4 illustrates an example method of generating and transmitting authentication information.
Figure 5:
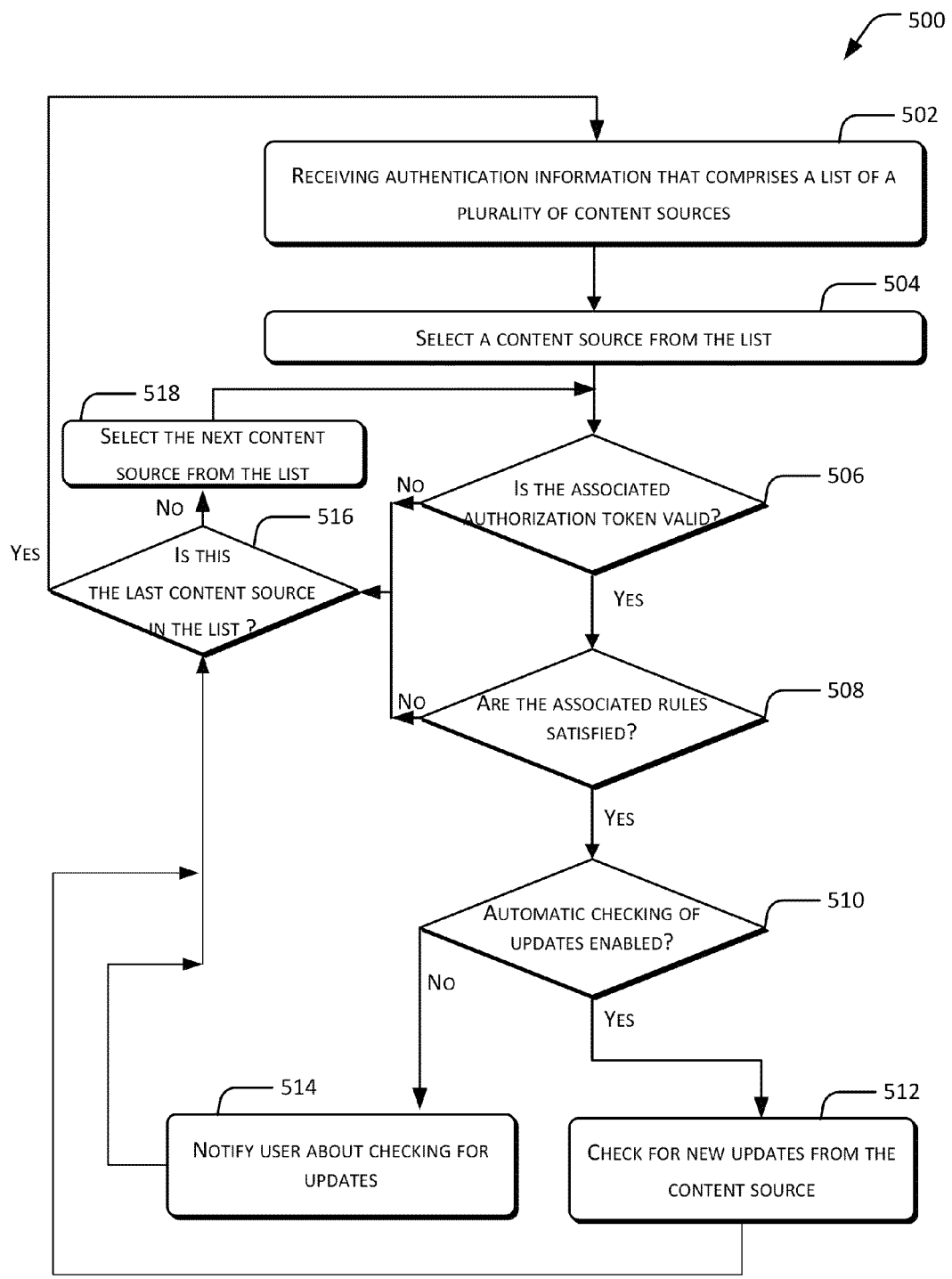
FIG. 5 illustrates an example method of software update distribution using the environment of FIG. 1.
Figure 6:
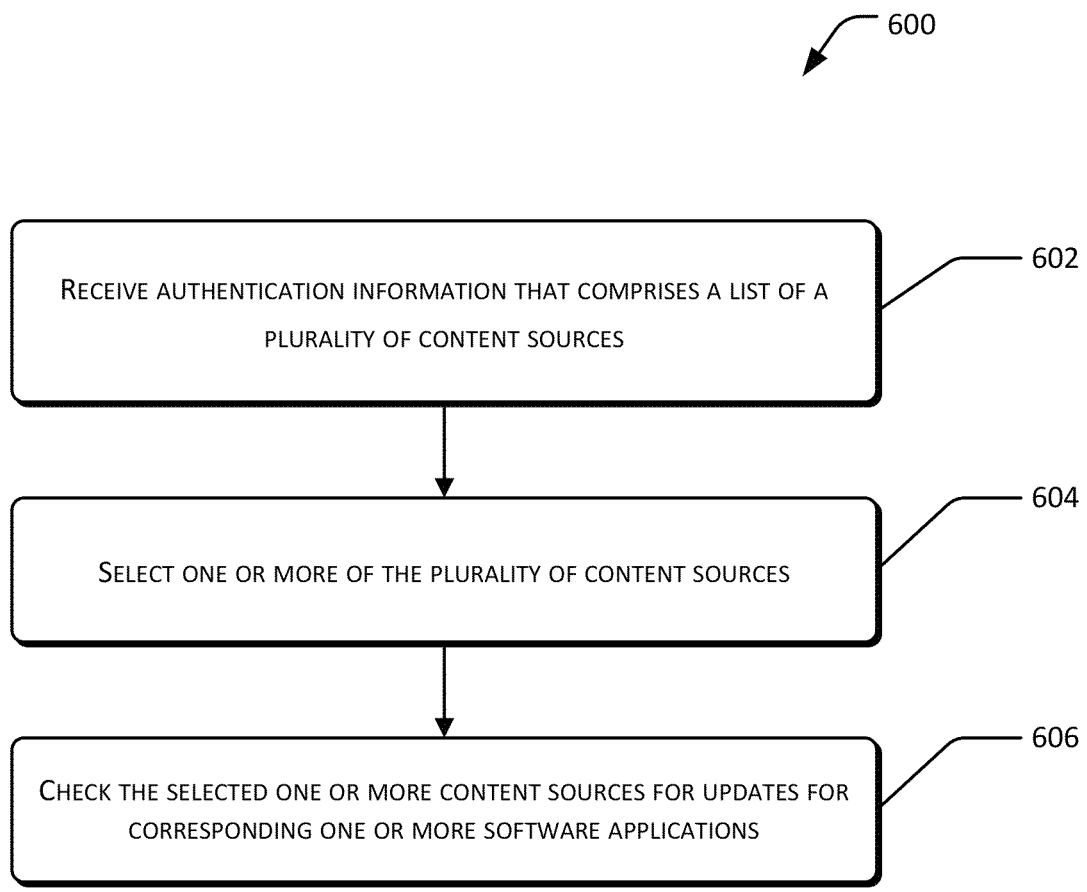
FIG. 6 illustrates another example method of software update distribution using the environment of FIG. 1.

FIG. 4 is a flow chart depicting an example method 400 of generating and transmitting authentication information 118. FIG. 5 is a flow chart depicting an example method 500 of software update distribution using the environment 100 of FIG. 1. FIG. 6 is a flow chart depicting another example method 600 of software update distribution using the environment 100 of FIG. 1. The methods of FIGS. 4-6 may, but need not, be implemented in the environment of FIG. 1. For ease of explanation, methods 400, 500 and 600 are described with reference to FIG. 1. However, the methods 400, 500 and 600 may alternatively be implemented in other environments and/or using other systems.

Methods 400, 500 and 600 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations.

Referring again to FIG. 4, at block 402, the content source authenticator 116 may determine that (i) each of a plurality of software applications are legitimate software applications, and (ii) a plurality of content sources 120A, . . . , 120N are authentic content sources for providing updates for the corresponding plurality of software applications.

At block 404, the content source authenticator 116 may generate the authentication information 118 that comprises a list of the plurality of content sources 120A, . . . , 120N. The authentication information 118 may also comprise, for each of the plurality of content sources, an authorization token that indicates an authenticity of the corresponding content source and an expiration time of the authorization token. The authentication information 118 may also comprise an address (e.g., an URL, an IP address, etc.) of each of the plurality of content sources. The authentication information 118 may also comprise, for each of the plurality of content sources, one or more rules and/or behavioral conditions associated with checking for updates for the corresponding software application from the corresponding content source.

At block 406, the content source authenticator 116 may transmit the authentication information 118 to a client device (e.g. the client device 102), to enable the client device to check for updates from one or more of the plurality of content sources.

Referring back to FIG. 5, at block 502, the client device 102 (e.g., the update agent 114) may receive, from the content source authenticator 116, the authentication information 118 that comprises a list of a plurality of content sources 120A, . . . , 120N.

At block 504, the update agent 114 may select a content source (e.g., content source 120A) from the list of the plurality of content sources 120A, . . . , 120N.

At block 506, the update agent 114 may verify if an authorization token associated with the selected content source 120A is valid and un-expired. If, at block 506, the authorization token associated with the selected content source 120A is invalid or has expired, the method advances to block 516. At block 516, the update agent 114 may verify if the selected content source 120A is the last content source in the list of the plurality of content sources 120A, . . . , 120N. If, at block 516, the selected content source 120A is the last content source in the list of the plurality of content sources 120A, . . . , 120N, the method may loop back to block 502 (i.e., the update agent 114 may wait for receiving an updated version of the authentication information 118 from the content source authenticator 116). If, at block 516, the selected content source 120A is not the last content source in the list of the plurality of content sources 120A, . . . , 120N, at block 518, the update agent 114 may select a next content source (e.g., content source 120B) from the list of the plurality of content sources 120A, . . . , 120N.

Referring again to block 506, if the authorization token associated with the selected content source 120A is valid and un-expired, the method advances to block 508. At block 508, the update agent 114 checks if the rules associated with the selected content source 120A is satisfied. For example, a rule associated with the content source 120A may specify that the update agent 114 may check for new updates for a software application from the content source 120A if a registry key or a file is stored in the client device 102 (which would indicate that the software application is installed in the client device 102). If, at block 508, the rules associated with the selected content source 120A are not satisfied, then the method 500 advances to block 516. If, at block 508, the rules associated with the selected content source 120A are satisfied, the method 500 advances to block 510.

At block 510, the update agent 114 may check if automatic checking of updates is enabled for the selected content source 120A (e.g., enabled by behavioral conditions specified in the authentication information 118, and/or enabled by the user through the UI 200).

If, at block 510, automatic checking of updates is enabled for the selected content source 120A, the method 500 advances to block 512. At block 512, the update agent 114 checks for new updates from the content source 120A, and then advances to block 516.

If, at block 510, automatic checking of updates is not enabled for the selected content source 120A, the method 500 advances to block 514. At block 514, the update agent 114 notifies the user about checking for updates from the content source 120A (e.g., to receive consent from the user before checking updates from content source 120A), and then advances to block 516. Blocks 510, 512, 514 are examples of the different behavioral conditions that a content source can specify, and do not encompass the entirety of the conditional checks that may be performed by the update agent 114.

Referring back to FIG. 6, at block 602, the client device 102 (e.g., the update agent 114) may receive, from the content source authenticator 116, the authentication information 118 that comprises a list of a plurality of content sources 120A, . . . , 120N.

At block 604, the update agent 114 may select one or more of the plurality of content sources. For example, the update agent 114 may select content sources 120A, . . . , 120M. Such selection may be based on, for example, verification of un-expired authorization tokes for the content sources, where the authorization tokes and associated expiration time are included in the authentication information 118. Such selection may also be based on, for example, verification of one or more rules associated with each of the content sources.

At block 606, the update agent 114 may check the selected one or more content sources for updates for corresponding one or more software applications. Checking the selected one or more content sources for updates may be based on one or more behavioral conditions associated with the one or more content sources.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

Conclusion

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method comprising:
    under control of one or more processors configured with executable instructions:
    receiving, by an update agent from a content source authenticator, authentication information associated with a plurality of content sources that comprises a list of the plurality of content sources;
    selecting a first content source from the list of the plurality of content sources included in the authentication information, wherein the first content source is configured to provide updates for a first software application; and
    checking the first content source for updates for the first software application.

2. The method of claim 1, wherein said selecting the first content source further comprises:
    determining that:
        the authentication information includes an un-expired authorization token that indicates an authenticity of the first content source, and
        a client device is configured to enable automatic checking of the first content source; and
    selecting the first content source in response to said determining.

3. The method of claim 1, wherein the update agent is configured to check the first content source for updates, the method further comprising:
    selecting, by the update agent, a second content source of the plurality of content sources, wherein the second content source is configured to provide updates for a second software application; and
    checking, by the update agent, the second content source for updates for the second software application.

4. The method of claim 3, further comprising:
    displaying a notification that notifies a user of updates available for the first software application and the second software application;
    receiving input from the user to download and install updates for at least one of first software application and the second software application; and
    downloading and installing updates for at least one of the first software application and the second software application.

5. The method of claim 1, wherein the first content source is configured to provide updates for a second software application, the method further comprising:
    checking the first content source for updates for the second software application.

6. The method of claim 1, wherein the authentication information further comprises, for each of the plurality of content sources, an authorization token that indicates an authenticity of the corresponding content source and an expiration time of the corresponding authorization token.

7. The method of claim 1, wherein the authentication information further comprises Uniform Resource Locators (URLs) of each of the plurality of content sources.

8. The method of claim 1, wherein the authentication information further comprises, for each of the plurality of content sources, a schedule and a frequency for checking and downloading updates.

9. The method of claim 1, wherein the authentication information specifies, for each of the plurality of content sources:
    whether updates from the corresponding content source is to be automatically downloaded and installed; or
    whether an input from a user is required to download and install updates from the corresponding content source.

10. One or more computer-readable devices configured with computer-executable instructions that, when executed by one or more processors, configure the one or more processors to perform acts comprising:
    determining that a plurality of content sources are authentic content sources for providing updates for a corresponding plurality of software applications; and
    generating authentication information that comprises:
        a list of the plurality of content sources, and
        for each of the plurality of content sources, an authorization token that indicates an authenticity of the corresponding content source and an expiration time of the authorization token.

11. The one or more computer-readable devices of claim 10, wherein the authentication information further comprises an address of each of the plurality of content sources.

12. The one or more computer-readable devices of claim 10, wherein the authentication information further comprises:
    for each of the plurality of content sources, one or more rules associated with checking for updates for the corresponding software application from the corresponding content source.

13. The one or more computer-readable devices of claim 12, wherein:
    for a first content source providing updates, a first rule specifies that if a first registry key or a first file is stored in a client device, the client device is to check for updates from the first content source; and
    for the first content source, a second rule specifies that if a software component is not stored in the client device, the client device is to refrain from checking for updates from the first content source.

14. The one or more computer-readable devices of claim 10, wherein the authentication information further comprises:
    for each of the plurality of content sources, a frequency and a schedule for checking for updates from the corresponding content source.

15. The one or more computer-readable devices of claim 10, wherein the authentication information further comprises:
    or a first content source providing updates, a first condition specifying that:
        if a client device is included in a corporate network, the client device is to check for updates from the first content source based upon an authorization from an administrator of the client device; and if the client device is not a part of the corporate network, the client device is to automatically check for updates for from the first content source.

16. The one or more computer-readable devices of claim 10, further comprising:
transmitting the authentication information to a client device, to enable the client device to check for updates from one or more of the plurality of content sources for a corresponding one or more of the plurality of software applications.

17. The one or more computer-readable devices of claim 10, further comprising:
determining that a first software application of the plurality of software applications is no longer a legitimate software application, wherein a first content source of plurality of content sources provides updates for the first software application;
based on determining that the first software application is no longer a legitimate software application, removing the first content source from the list included in the authentication information.

18. The one or more computer-readable devices of claim 10, further comprising :
determining that a second content source is no longer an authentic content source for providing updates; and
based on determining that the second content source is no longer an authentic content source, removing the second content source from the list included in the authentication information.

19. The one or more computer-readable devices of claim 10, further comprising:
transmitting the authentication information in a form of an xml file contained within a cabinet file.

20. A system comprising:
one or more processors; and
memory, communicatively coupled to the one or more processors, storing instructions that, when executed by the one or more processors, configure the one or more processors to perform acts comprising:
receiving, at a client device, authentication information associated with a plurality of content sources that comprises a list of the plurality of content sources and a plurality of rules;
determining that a rule of the plurality of rules, associated with a first content source of the plurality of content sources, is satisfied on the client device;
in response to the determining that the rule associated with the first content source is satisfied, checking the first content source for updates;
determining that another rule of the plurality of rules, associated with a second content source of plurality of content sources, is not satisfied on the client device; and
in response to determining that the another rule associated with the second content source is not satisfied, refraining from checking the second content source for updates.

* * * * *